July 7, 1936.   J. GEPHARDT   2,047,063
FUR BEARING ANIMAL TRAP
Filed April 22, 1935   2 Sheets-Sheet 1
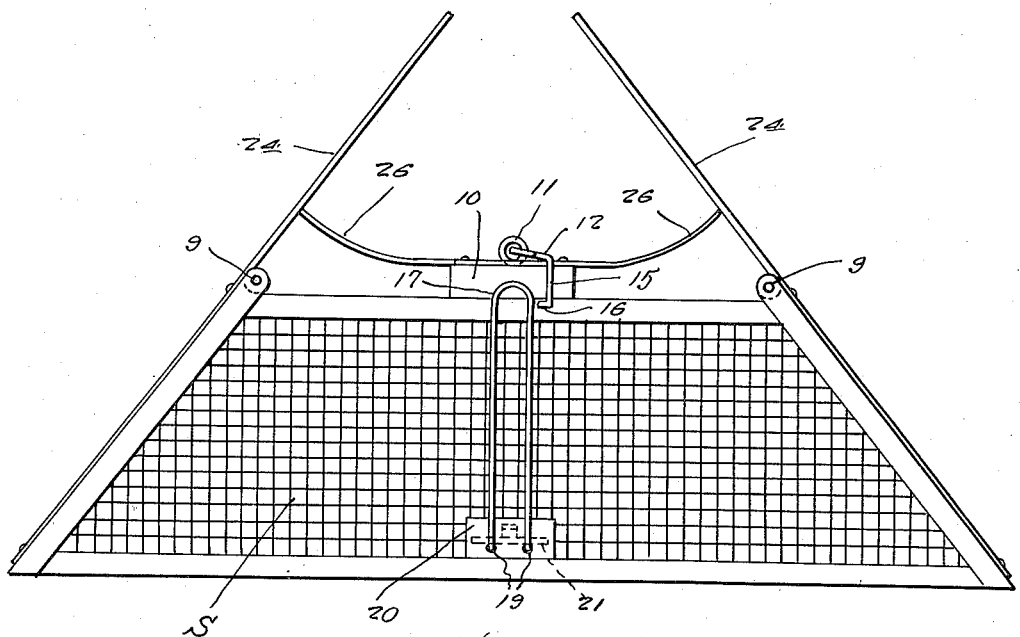
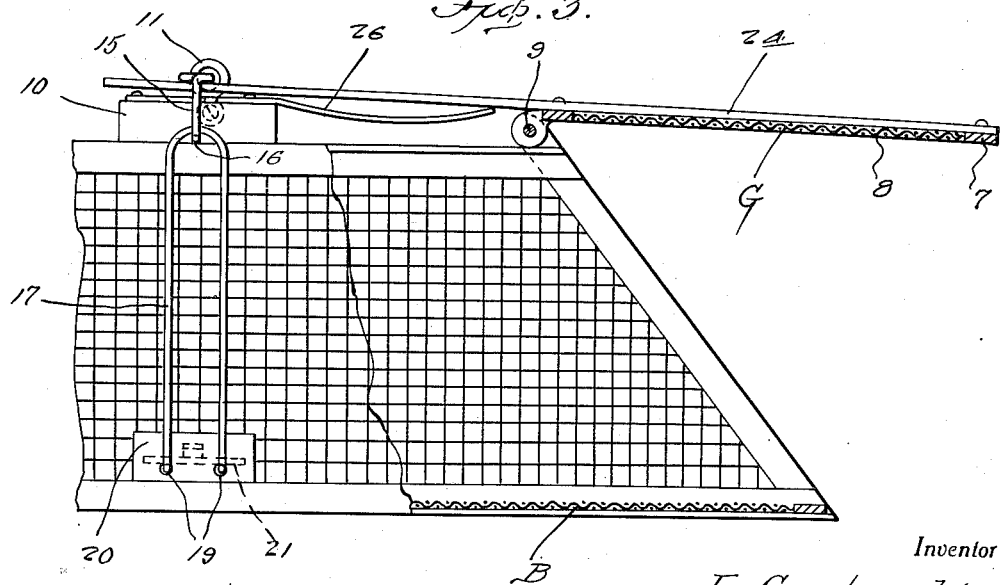
Inventor
J. Gephardt
By Clarence A. O'Brien
Attorney July 7, 1936.   J. GEPHARDT   2,047,063
FUR BEARING ANIMAL TRAP
Filed April 22, 1935   2 Sheets-Sheet 2

Inventor
J. Gephardt

By Clarence A. O'Brien
Attorney

Patented July 7, 1936

2,047,063

UNITED STATES PATENT OFFICE 2,047,063

FUR BEARING ANIMAL TRAP

Julius Gephardt, Washington, Mo.

Application April 22, 1935, Serial No. 17,727

1 Claim. (Cl. 43—61)

The present invention relates to a trap designed particularly for use in trapping fur bearing animals and the object of the invention resides in the provision of an efficient construction which is simple, strong and durable, thoroughly efficient and reliable in operation, easy to manipulate and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a side elevation of a trap embodying the features of my invention.

Figure 3 is a fragmentary side elevation showing one end of the trap in set position.

Figure 2:
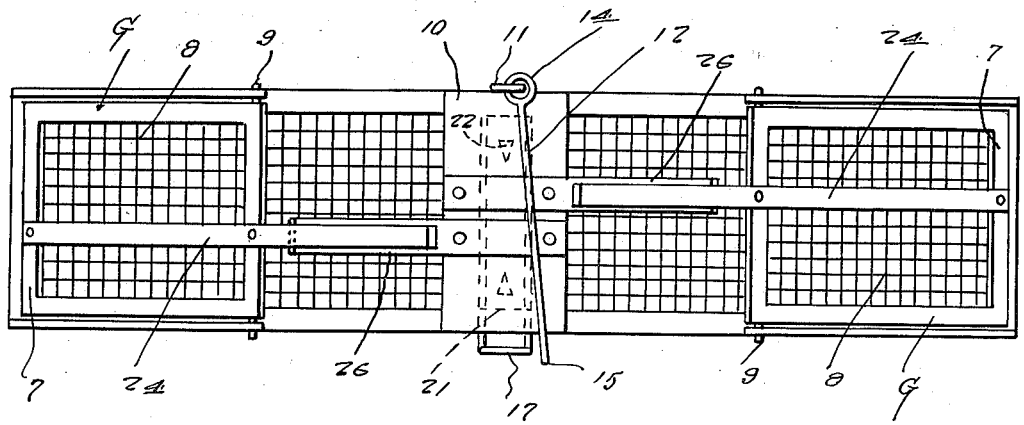
Figure 2 is a top plan view thereof.

Referring to the drawings in detail it will be seen that the letter B denotes the bottom, letters S—S denote the sides and letter T denotes the top of a cage which is open at the ends. It will be noted that the bottom, the sides and the top are constructed of frame forming iron strips 5 with mesh wire panels 6. It is also to be noted that the length of the top is less than the length of the bottom and the end frame members 5 of the sides S converge upwardly.

Gates G include frame forming strips 7 and mesh wire panels 8. These gates G are hingedly mounted as at 9 at the upper portions of the ends of the cage as is shown to advantage in Figure 3. Across the central portion of the top T there is disposed a block 10. At one end of the block 10 there is fixed an eye member 11. A trigger rod 12 has an eye 14 formed at one end and engaged with the eye member 11 and at the other end is provided with a right angle extension 15 having a terminal 16 disposed inwardly. Numerals 17 denotes an oblong loop having extensions 18 extending through openings 19 in a plate 20 mounted in one of the strips of the frame of the bottom B as is illustrated to advantage in Figure 4 and these extensions 18 have fixed thereto a plate 21 with suitable bait holding prongs 22 rising therefrom.

Figure 4:
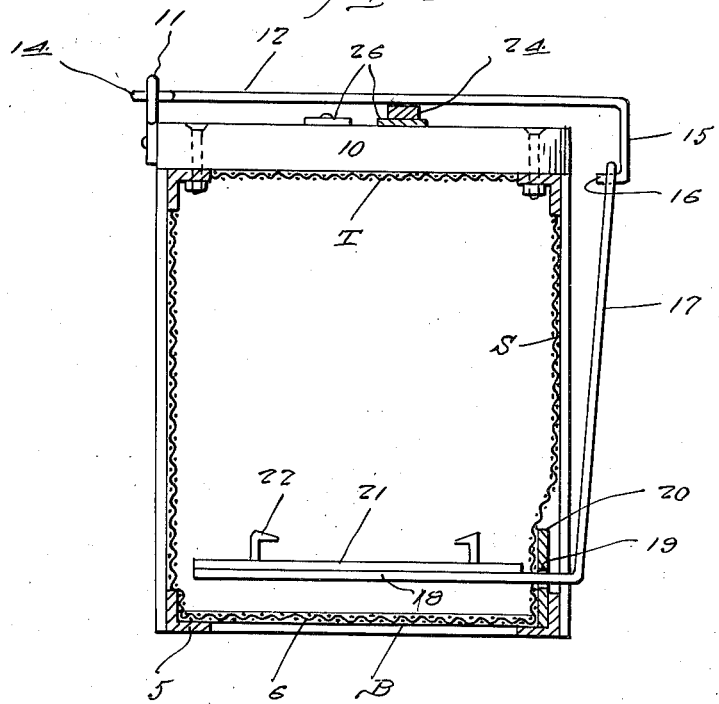
Figure 4 is a vertical central transverse section showing the parts in set position.

On each gate G there is fixed an elongated bar 24 extending from the free end thereof outwardly beyond the hinged end thereof as is illustrated to advantage in Figures 1 and 3 and the ends of these bars may be disposed under the trigger rod 12 as shown to advantage in Figures 3 and 4. On the block 10 there are springs 26 which extend out under the bars 24 and when the gates are in set position as shown in Figures 3 and 4 these springs tend to urge the gates to a closed position as shown in Figure 1 and hold the gate in such position.

It will be noted that the bars 24 are disposed in offset relationship and with the parts as illustrated in Figures 2 and 3 the bars may be swung so as to open the gates to the position shown in Figure 2 and may be disposed under the trigger 12 against the tension of the springs 26. One or both of the gates may be thus set. When an animal enters an open end of the cage and contacts with the bait on the plate 21 this will cause said plate to be depressed thereby swinging the elongated loop 17 out of engagement with the terminal 16 thus permitting the springs 26 to close the gates and thereby trap the animal and it is to be noted that the springs will hold the gates closed as shown to advantage in Figure 1 because these springs bow upwardly and before the gates can be opened it is necessary to depress the springs.

It is thought that the construction, operation, utility and advantages of this invention will now be clearly understood by those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

It is also apparent that the trap may be used not only for fur bearing animals, but also for rabbits, rats and all species of animals, and that the size of the trap may be varied to suit the particular purpose for which the trap is to be used.

Having thus described the invention, what is claimed as new is:

A trap of the class described comprising a body having one end open and said end sloping upwardly and inwardly, a gate closing said end, means for hingedly connecting the upper end of the gate to the body, a bar connected with the gate and extending beyond the hinged end thereof, a block on the top of the body, an elongated spring clip having one end portion connected to the top of the block with the other end normally engaging the bar for holding the gate in closed position, the bar resting on the clip and extending over the block when the gate is in open position, a trigger bar having one end movably connected with a side portion of the top of the body and extending across the block and over the bar, when the gate is in open position and having a depending portion provided with a projection, an angle-shaped looped member supported for rocking movement in a side portion of the body with its bight adapted to engage the projection and portions of its limbs extending into the body, and a bait plate connected with said portion.

JULIUS GEPHARDT.